(12) United States Patent
Zhang et al.

(10) Patent No.: US 11,979,763 B2
(45) Date of Patent: May 7, 2024

(54) METHOD FOR CHANNEL MEASUREMENT AND DEVICE THEREOF

(71) Applicant: Samsung Electronics Co., Ltd., Suwon-si (KR)

(72) Inventors: Yiyan Zhang, Beijing (CN); He Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 17/267,017

(22) PCT Filed: Aug. 9, 2019

(86) PCT No.: PCT/KR2019/010117
§ 371 (c)(1),
(2) Date: Feb. 8, 2021

(87) PCT Pub. No.: WO2020/032716
PCT Pub. Date: Feb. 13, 2020

(65) Prior Publication Data
US 2021/0306893 A1 Sep. 30, 2021

(30) Foreign Application Priority Data

Aug. 9, 2018 (CN) .......................... 201810908377.5
Feb. 14, 2019 (CN) .......................... 201910116835.6

(51) Int. Cl.
*H04W 24/10* (2009.01)
*H04W 24/08* (2009.01)
*H04W 72/20* (2023.01)

(52) U.S. Cl.
CPC .......... *H04W 24/10* (2013.01); *H04W 24/08* (2013.01)

(58) Field of Classification Search
None
See application file for complete search history.

(56) References Cited

U.S. PATENT DOCUMENTS

2019/0239106 A1* 8/2019 Cui ...................... H04W 24/08
2019/0260530 A1 8/2019 Yi et al.
(Continued)

FOREIGN PATENT DOCUMENTS

| CN | 102572917 A | 7/2012 |
|---|---|---|
| CN | 108366379 A | 8/2018 |
| WO | 2018/084571 A1 | 5/2018 |

OTHER PUBLICATIONS

The First Office Action dated Nov. 15, 2022, in connection with Chinese Application No. 201910116835.6, 18 pages.

(Continued)

*Primary Examiner* — Duc T Duong

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention relates to a method for channel measurement and device.

20 Claims, 7 Drawing Sheets

(56) References Cited

U.S. PATENT DOCUMENTS

| | | | | |
|---|---|---|---|---|
| 2019/0306734 | A1* | 10/2019 | Huang | H04W 24/08 |
| 2020/0359246 | A1* | 11/2020 | Zhang | H04W 76/19 |
| 2020/0396627 | A1* | 12/2020 | Hwang | H04W 24/08 |
| 2021/0014751 | A1* | 1/2021 | Callender | H04W 72/0446 |
| 2021/0014752 | A1* | 1/2021 | Axmon | H04W 36/0088 |
| 2021/0058807 | A1* | 2/2021 | Cui | H04W 24/10 |
| 2021/0058996 | A1* | 2/2021 | Yang | H04W 56/001 |
| 2021/0127391 | A1* | 4/2021 | Zhang | H04L 5/0053 |
| 2021/0175985 | A1* | 6/2021 | Yoon | H04W 56/00 |
| 2021/0227409 | A1* | 7/2021 | Siomina | H04B 7/0617 |

OTHER PUBLICATIONS

NTT Docomo, Inc., "Discussion on collision among RLM-RS, SMTC and measurement gap", GPP TSG RAN WG4 Meeting #86bis, Apr. 16-20, 2018, R4-1804607, 6 pages.

Huawei, HiSilicon, "Further discussion on gap sharing", 3GPP TSG-RAN WG4 Meeting AH-1807 LTE/NR perf, Jul. 2-6, 2018, R4-1809015, 4 pages.

Nokia et al., "Further discussion on remaining issues for RLM requirements", 3GPP TSG-RAN WG4 AH 1801, Jan. 22-26, 2018, R4-1800366, 3 pages.

NTT Docomo, "WF on collision issue among RLM-RS, SMTC and measurement gap", 3GPP TSG-RAN WG4 #86bis, Apr. 16-20, 2018, R4-1805541, 7 pages.

Samsung, "Draft CR for Measurement Gap Sharing in NE-DC (Section 9.1.2, 9.1.5)", Change Request, 3GPP TSG-RAN WG4 Meeting #91, May 13-17, 2019, R4-1907761, 3 pages.

Sasmung et al., "Way forward on gap sharing for measurement prioritization in different scenarios", 3GPP TSG-RAN WG4#88 Meeting, Aug. 20-24, 2018, R4-1811854, 4 pages.

International Search Report dated Nov. 22, 2019 in connection with International Patent Application No. PCT/KR2019/010117, 3 pages.

Written Opinion of the International Searching Authority dated Nov. 22, 2019 in connection with International Patent Application No. PCT/KR2019/010117, 7 pages.

European Patent Office, "Supplementary European Search Report" dated Sep. 1, 2021, in connection with counterpart European Patent Application No. 19846869.6, 10 pages.

3GPP TS 38.133 V15.2.0 (Jun. 2018) Technical Specification; 3rd Generation Partnership Project; Technical Specification Group Radio Access Network; NR; Requirements for support of radio resource management (Release 15), 79 pages.

3GPP TS 38.331 V15.2.1 (Jun. 2018) Technical Specification; 3rd Generation Partnership Project; Technical Specification Group Radio Access Network; NR; Radio Resource Control (RRC) protocol specification (Release 15) 303 pages.

Nokia et al., "Introduction of carrier scaling factor", 3GPP TSG-RAN WG4-AH-1807, Montreal, Canada, Jul. 2-6, 2018, R4-1808779, 3 pages.

Third Office Action Notification dated Jun. 6, 2023, in connection with Chinese Application No. 201910116835.6, 13 pages.

\* cited by examiner

METHOD FOR CHANNEL MEASUREMENT AND DEVICE THEREOF

CROSS-REFERENCE TO RELATED APPLICATIONS

This application is a 371 of International Application No. PCT/KR2019/010117 filed on Aug. 9, 2019, which claims priority to Chinese Patent Application No. 201810908377.5 filed on Aug. 9, 2018 and Chinese Patent Application No. 201910116835.6 filed on Feb. 14, 2019, the disclosures of which are herein incorporated by reference in their entirety.

BACKGROUND

1. Field

The present invention relates to a field of wireless communication technology, and in particular, to a method for a channel measurement and device thereof.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The object of the present invention is to solve the problem of the use of measurement gap in the new generation wireless communication system. In particular, the manner in which the UE in the NR network configures radio resources is different from that in the LTE-A network, and the reference signal in the NR network is different from that in the LTE-A network in which the reference signal may be obtained in each frame for measurement. In view of that, it is necessary to provide a technical solution to solve at least the following problems: when the UE needs to configure measurement gap during the measurement procedure in the NR network; and among all the measurements that the UE needs to configure the measurement gap, if multiple measurement tasks requires the same measurement gap, how to allocate and share the measurement gap among the measurement tasks. The present invention provides a method of using the measurement gap suitable for the characteristics of the network to reduce unwanted network transmission interruption caused by the measurement gap, thereby improving the usage efficiency of wireless resources in the network.

SUMMARY

Hence, the present invention provides two solutions for measurement gaps in intra-frequency measurement of the UE, and a solution for sharing the measurement gap when multiple measurement objects are in the same measurement gap, according to the characteristics of the network. In present solution, the UE may determine whether to configure a measurement gap in the intra-frequency measurement according to BWP configured in the network, and if multiple measurement objects share the measurement gap, the network may allocate the measurement gap according to a current state of the network. The present invention provides a method of using the measurement gap suitable for different networks according to the characteristics of the networks, in consideration of both limits of hardware and complexity design of network protocols.

In particular, the present invention provides a method for channel measurement, including: determining, by a user equipment, that an intra-frequency measurement is to be performed; determining whether a measurement gap is required according to a relationship between a bandwidth part configured by the user equipment and a synchronization signal block required for the intra-frequency measurement; and performing the channel measurement based on the determined result.

Wherein determining whether the measurement gap is required according to the relationship between the bandwidth part configured by the user equipment and the synchronization signal block required for the intra-frequency measurement comprises at least one of: determining that the measurement gap is required if the synchronization signal block required for the intra-frequency measurement is not completely contained in a currently active bandwidth part of the user equipment; and determining that the measurement gap is not required if the synchronization signal block required for the intra-frequency measurement is completely contained in the currently active bandwidth part of the user equipment.

Wherein determining whether the measurement gap is required according to the relationship between the bandwidth part configured by the user equipment and the synchronization signal block required for the intra-frequency measurement comprises at least one of: determining that the measurement gap is required if at least one bandwidth part of the user equipment does not completely contain the synchronization signal block used in the intra-frequency measurement; and determining that the measurement gap is not required if each bandwidth part of the user equipment completely contains the synchronization signal block used in the intra-frequency measurement.

Wherein performing the channel measurement based on the determined result comprises at least one of: when the determined result indicates that the measurement gap is required, the user equipment receives the synchronization signal block within the measurement gap and performs the measurement on the corresponding channel according to the synchronization signal block; when the determined result indicates that the measurement gap is not required, and the synchronization signal required for the intra-frequency measurement and the measurement gap completely overlap with each other, the user equipment receives the synchronization signal block within the measurement gap and performs the measurement on the corresponding channel according to the synchronization signal block; and when the determined result indicates that the measurement gap is not required, and the synchronization signal required for the intra-frequency measurement and the measurement gap do not completely overlap with each other, the user equipment receives the synchronization signal block outside the measurement gap and performs the measurement on the corresponding channel according to the synchronization signal block.

The present invention also provides a novel method to solve the problem about how to share the measurement gap among multiple measurement objects in UE measurement, if these measurement objects are required with configuration of the measurement gap during the measurement procedure while the measurement procedure overlap in time with the same measurement gap, as well as how to allocate the usage of the measurement gap.

In the present invention, an RRC signaling configured by a higher layer is introduced in the network. The RRC signaling, called X, may have a length of 2 bits, and indicate at most 4 different modes to allocate the measurement gap to respective measurement objects.

In the present invention, the above-mentioned signaling X as well as the 4 different modes indicated by the signaling X may vary according to the current network state, in order to achieve a more reasonable resource configuration in different network states through limited signaling overhead. The different network states may refer to the state of the network accessed by the UE performing the measurement in a connected state is for example, either a single connection state or a dual connection state, and if a dual connection state, either an NE-DC state or NR-NR DC state, etc. Also, the types of measurement gap configured by the UE may also be different (for example, a per-FR measurement or a per-UE measurement gap may be configured) and thus indicate different states.

In addition, the present invention defines the applicable range and application manner of the measurement gap sharing scheme, i.e. on which measurement gap the measurement gap sharing scheme is applicable. In particular, for the measurement gap sharing scheme in above respective conditions, If the sharing scheme is to equally allocate all the measurement gaps to all the measurement objects, when there are two or more different measurement objects within the measurement gap, the sharing scheme is applicable to all this type of measurement gaps; when there is only one measurement object within the measurement gap, it is not necessary to share the measurement gap. If the sharing scheme is to allocate at least or at most Y % of the measurement gap to a certain type of the measurement (Type 1) and allocate the remaining of the measurement gap to the other types of the measurement (Type 2), when there are at least one Type 1 measurement object and at least one Type 2 measurement object within the measurement gap, the sharing scheme is applicable to all this type of measurement gaps; when there is only one type of the measurement objects within the measurement gap (either Type 1 or Type 2), it not necessary to share the measurement gap and all the measurement objects of the same type have an equal opportunity to be measured within the measurement gap allocated for this type.

In particular, the present invention provides a method for channel measurement, including: receiving, by a user equipment, a radio resource control RRC signaling; determining a measurement gap used in the measurement and/or determining a scaling factor for a performance requirement of the measurement, depending on the RRC signaling as well as the connectivity mode of the user equipment and/or the type of configured measurement gap of the user equipment; and performing the channel measurement by using the measurement gap and/or calculating out the scaling factor for a performance requirement of the measurement, according to the determined result.

The present invention further provides a method for channel measurement, including: transmitting, by a base station, a radio resource control RRC signaling; determining a measurement gap used in the measurement and/or determining a scaling factor for a performance requirement of the measurement, depending on the RRC signaling as well as the connectivity mode of the user equipment and/or the type of configured measurement gap of the user equipment; and performing the channel measurement by using the measurement gap and/or calculating out the scaling factor for a performance requirement of the measurement, according to the determined result.

Wherein determining the measurement gap used in the measurement depending on the RRC signaling as well as the connectivity mode of the user equipment and/or the type of configured measurement gap of the user equipment comprises: determining an equally allocated measurement gap, or a ratio of the measurement gap used in one type of the measurement to all the measurement gaps, or a lower limit value or upper limit value of, depending on the RRC signaling as well as the connectivity mode of the user equipment and/or the type of configured measurement gap of the user equipment.

Wherein determining the measurement gap used in the measurement depending on the RRC signaling as well as the connectivity mode of the user equipment and/or the type of configured measurement gap of the user equipment comprises: when the user equipment is in a single-connection state and the type of configured measurement gap of the user equipment is a user equipment-specific measurement gap, the allocation of the measurement gap is determined by one of the following manners: when the state of the RRC signaling is the first value, the RRC signaling is for indicating that all the measurement gaps are equally allocated to all measurements required to receive the synchronization signal block within the measurement gap, and the user equipment determines the measurement gap used in the measurement depending on the RRC signaling; when the state of the RRC signaling is the second value, the RRC signaling is for indicating that at least or at most Y1% of the measurement gap is allocated to measurement objects of the user equipment on a first frequency band, and the remaining of the measurement gap is allocated to the other measurement objects to be measured by the UE and required to receive the synchronization signal block within the measurement gap, and the user equipment determines the measurement gap used in the measurement depending on the RRC signaling; when the state of the RRC signaling is the third value, the RRC signaling is for indicating that at least or at most Y2% of the measurement gap is allocated to measurement objects of the user equipment on the first frequency band, and the remaining of the measurement gap is allocated to the other measurement objects to be measured by the UE and required to receive the synchronization signal block within the measurement gap, and the user equipment determines the measurement gap used in the measurement depending on the RRC signaling; and when the state of the RRC signaling is the fourth value, the RRC signaling is for indicating that at least or at most Y3% of the measurement gap is allocated to measurement objects of the user equipment on the first frequency band, and the remaining of the measurement gap is allocated to the other measurement objects to be measured by the UE and required to receive the synchronization signal block within the measurement gap, and the user equipment determines the measurement gap used in the measurement depending on the RRC signaling.

Wherein determining the measurement gap used in the measurement depending on the RRC signaling as well as the connectivity mode of the user equipment and/or the type of configured measurement gap of the user equipment comprises: when the user equipment is in a single-connection state and the type of configured measurement gap of the user equipment is a band-specific measurement gap, the allocation of the measurement gap is determined by one of the following manners: when the state of the RRC signaling is the first value, the RRC signaling is for indicating that all the measurement gaps are equally allocated to all measurements required to receive the synchronization signal block within the measurement gap, and the user equipment determines the measurement gap used in the measurement depending on the RRC signaling; when the state of the RRC signaling is the second value, the RRC signaling is for indicating that at least or at most Y1% of the measurement gap is allocated to the intra-frequency measurement of the user equipment, and the remaining of the measurement gap is allocated to the other measurement objects to be measured by the UE and required to receive the synchronization signal block within the measurement gap, and the user equipment determines the measurement gap used in the measurement depending on the RRC signaling; when the state of the RRC signaling is the third value, the RRC signaling is for indicating that at least or at most Y2% of the measurement gap is allocated to the intra-frequency measurement of the user equipment, and the remaining of the measurement gap is allocated to the other measurement objects to be measured by the UE and required to receive the synchronization signal block within the measurement gap, and the user equipment determines the measurement gap used in the measurement depending on the RRC signaling; and when the state of the RRC signaling is the fourth value, the RRC signaling is for indicating that at least or at most Y3% of the measurement gap is allocated to the intra-frequency measurement of the user equipment, and the remaining of the measurement gap is allocated to the other measurement objects to be measured by the UE and required to receive the synchronization signal block within the measurement gap, and the user equipment determines the measurement gap used in the measurement depending on the RRC signaling.

Wherein determining the measurement gap used in the measurement depending on the RRC signaling as well as the connectivity mode of the user equipment and/or the type of configured measurement gap of the user equipment comprises: when the user equipment is in a dual connection state NE-DC in which the user equipment is simultaneously connected to NR base station as a master cell group and LTE base station as the secondary cell group and the type of configured measurement gap of the user equipment is a user equipment-specific measurement gap or a band-specific measurement gap, the allocation of the measurement gap is determined by one of the following manners: when the state of the RRC signaling is the first value, the RRC signaling is for indicating that all the measurement gaps are equally allocated to all measurements required to receive the synchronization signal block within the measurement gap, and the user equipment determines the measurement gap used in the measurement depending on the RRC signaling; when the state of the RRC signaling is the second value, the RRC signaling is for indicating that at least or at most Y1% of the measurement gap is allocated to measurement objects on the NR network or FR1 measurement objects in NR or FR1 intra-frequency measurement objects in NR, and the remaining of the measurement gap is allocated to the other measurement objects to be measured by the UE and required to receive the synchronization signal block within the measurement gap, and the user equipment determines the measurement gap used in the measurement depending on the RRC signaling; when the state of the RRC signaling is the third value, the RRC signaling is for indicating that at least or at most Y2% of the measurement gap is allocated to measurement objects on the NR network or FR1 measurement objects in NR or FR1 intra-frequency measurement objects in NR, and the remaining of the measurement gap is allocated to the other measurement objects to be measured by the UE and required to receive the synchronization signal block within the measurement gap, and the user equipment determines the measurement gap used in the measurement depending on the RRC signaling; and when the state of the RRC signaling is the fourth value, the RRC signaling is for indicating that at least or at most Y3% of the measurement gap is allocated to measurement objects on the NR network or FR1 measurement objects in NR or FR1 intra-frequency measurement objects in NR, and the remaining of the measurement gap is allocated to the other measurement objects to be measured by the UE and required to receive the synchronization signal block within the measurement gap, and the user equipment determines the measurement gap used in the measurement depending on the RRC signaling.

Wherein determining the measurement gap used in the measurement depending on the RRC signaling as well as the connectivity mode of the user equipment and/or the type of configured measurement gap of the user equipment comprises: when the user equipment is in a dual connection state NE-DC, in which the user equipment is simultaneously connected to NR base station as a master cell group and LTE base station as the secondary cell group, the allocation of the measurement gap is determined by one of the following manners: when the state of the RRC signaling is the first value, the RRC signaling is for indicating that all the measurement gaps are equally allocated to all the measurements required to receive the synchronization signal block within the measurement gap, and the user equipment determines the measurement gap used in the measurement depending on the RRC signaling; when the state of the RRC signaling is the second value, the RRC signaling is for indicating that at least or at most Y4% of the measurement gap is allocated to the intra-frequency measurement on the NR network or FR1 measurement objects in NR or FR1 intra-frequency measurement objects in NR, and the remaining of the measurement gap is allocated to the other measurement objects to be measured by the UE and required to receive the synchronization signal block within the measurement gap, and the user equipment determines the measurement gap used in the measurement depending on the RRC signaling; when the state of the RRC signaling is the third value, the RRC signaling is for indicating that at least or at most Y5% of the measurement gap is allocated to an inter-frequency measurement on the NR network, and the remaining of the measurement gap is allocated to the other measurement objects to be measured by the UE and required to receive the synchronization signal block within the measurement gap, and the user equipment determines the measurement gap used in the measurement depending on the RRC signaling; and when the state of the RRC signaling is the fourth value, the RRC signaling is for indicating that at least or at most Y6% of the measurement gap is allocated to measurement objects on the LTE network, and the remaining of the measurement gap is allocated to the other measurement objects to be measured by the UE and required to receive the synchronization signal block within the measurement gap, and the user equipment determines the measurement gap used in the measurement depending on the RRC signaling.

Wherein determining the measurement gap used in the measurement depending on the RRC signaling as well as the connectivity mode of the user equipment and/or the type of configured measurement gap of the user equipment comprises: when the user equipment is in a dual connection state NR-NR DC, in which the user equipment is simultaneously connected to NR master cell group and NR secondary cell group, the allocation of the measurement gap is determined by one of the following manners: when the state of the RRC signaling is the first value, the RRC signaling is for indicating that all the measurement gaps are equally allocated to all measurements required to receive the synchronization signal block within the measurement gap, and the user equipment determines the measurement gap used in the measurement depending on the RRC signaling; when the state of the RRC signaling is the second value, the RRC signaling is for indicating that at least or at most Y1% of the measurement gap is allocated to measurement objects on a NR master cell group or intra-frequency measurement objects on the NR master cell group, and the remaining of the measurement gap is allocated to the other measurement objects to be measured by the UE and required to receive the synchronization signal block within the measurement gap, and the user equipment determines the measurement gap used in the measurement depending on the RRC signaling; when the state of the RRC signaling is the third value, the RRC signaling is for indicating that at least or at most Y2% of the measurement gap is allocated to the measurement objects on the NR master cell group or intra-frequency measurement objects on the NR master cell group, and the remaining of the measurement gap is allocated to the other measurement objects to be measured by the UE and required to receive the synchronization signal block within the measurement gap, and the user equipment determines the measurement gap used in the measurement depending on the RRC signaling; and when the state of the RRC signaling is the fourth value, the RRC signaling is for indicating that at least or at most Y3% of the measurement gap is allocated to the measurement objects on the NR master cell group or intra-frequency measurement objects on the NR master cell group, and the remaining of the measurement gap is allocated to the other measurement objects to be measured by the UE and required to receive the synchronization signal block within the measurement gap, and the user equipment determines the measurement gap used in the measurement depending on the RRC signaling.

Wherein determining the measurement gap used in the measurement depending on the RRC signaling as well as the connectivity mode of the user equipment and/or the type of configured measurement gap of the user equipment comprises: when the user equipment is in a dual connection state NR-NR DC, in which the user equipment is simultaneously connected to NR master cell group and NR secondary cell group, the allocation of the measurement gap is determined by one of the following manners: when the state of the RRC signaling is the first value, the RRC signaling is for indicating that all the measurement gaps are equally allocated to all measurements required to receive the synchronization signal block within the measurement gap, and the user equipment determines the measurement gap used in the measurement depending on the RRC signaling; when the state of the RRC signaling is the second value, the RRC signaling is for indicating that at least or at most Y4% of the measurement gap is allocated to measurement objects on a NR master cell group or the intra-frequency measurement objects on the NR master cell group, and the remaining of the measurement gap is allocated to the other measurement objects to be measured by the UE and required to receive the synchronization signal block within the measurement gap, and the user equipment determines the measurement gap used in the measurement depending on the RRC signaling; when the state of the RRC signaling is the third value, the RRC signaling is for indicating that at least or at most Y5% of the measurement gap is allocated to the inter-frequency measurement on the NR master cell group, and the remaining of the measurement gap is allocated to the other measurement objects to be measured by the UE and required to receive the synchronization signal block within the measurement gap, and the user equipment determines the measurement gap used in the measurement depending on the RRC signaling; and when the state of the RRC signaling is the fourth value, the RRC signaling is for indicating that at least or at most Y6% of the measurement gap is allocated to all the measurement objects on the NR secondary cell group, and the remaining of the measurement gap is allocated to the other measurement objects to be measured by the UE and required to receive the synchronization signal block within the measurement gap, and the user equipment determines the measurement gap used in the measurement depending on the RRC signaling.

Wherein, Y1 may be a value of 25, Y2 may be a value of 50, Y3 may be a value of 75, Y4 may be a value of 50, Y5 may be a value of 25, and Y6 may be a value of 50.

Wherein determining the measurement gap used in the measurement depending on the RRC signaling as well as the connectivity mode of the user equipment and/or the type of configured measurement gap of the user equipment comprises: determining measurement gap used in the measurement within the measurement gap where there are a type of the measurement indicated by the RRC signaling and one or more other types of the measurement, depending on the RRC signaling as well as the connectivity mode of the user equipment and/or the type of configured measurement gap of the user equipment.

Wherein when a certain type of the measurement indicated by the RRC signaling includes at least two measurement objects, the at least two measurement objects have an equal opportunity to use the measurement gap allocated to this type of the measurement.

Regarding a scaling factor for a performance requirement of the measurement, the scaling factor, when the UE is in the NE-DC state or the NR-NR DC connection state, is determined by an allocation ratio in any method of the sharing allocation schemes of the measurement gap described above.

The method of determining the scaling factor specifically includes at least one of the following:

If a measurement gap allocation ratio of a certain type of measurement is Y %, the scaling factor for the performance requirement of such type of measurement is 1/Y×100;

The scaling factor for the performance requirement of other types of measurement other than such type of measurement is 1/(100−Y)×100.

When the user equipment is in a dual connection state NE-DC in which the user equipment is simultaneously connected to NR base station as a master cell group and LTE base station as the secondary cell group, the above-mentioned certain type of measurement objects includes intra-frequency measurement objects on the NR network or FR1 measurement objects in NR or FR1 intra-frequency measurement objects in NR; when the user equipment is in a dual connection state NR-NR DC, in which the user equipment is simultaneously connected to NR master cell group and NR secondary cell group, the above certain type of measurement object includes FR1 measurement objects in NR or FR1 intra-frequency measurement objects in NR.

The network may implicitly specify a sharing allocation scheme for the UE measurement gap, and only specifies the scaling factor for the performance requirement of the measurement. When calculating the scaling factor, a classification manner of the measurement objects is the same as that of the measurement in the aforementioned allocation scheme.

The present invention further provides a user equipment, comprising: a receiving module, to receive RRC signaling; a determining module, to determine a measurement gap used in the measurement, depending on the RRC signaling as well as the connectivity mode of the user equipment and/or the measurement gap type of the user equipment; and a measuring module, to perform channel measurement using the measurement gap and/or determine a scaling factor for a performance requirement of the measurement, according to the determined result.

The present invention further provides a user equipment, comprising: a determining module, to determine that an intra-frequency measurement is to be performed, and to determine whether a measurement gap is required according to a relationship between a bandwidth part configured by the user equipment and a synchronization signal block required for the intra-frequency measurement; and a measuring module, to perform channel measurement and/or determine a scaling factor for a performance requirement of the measurement based on the determined result.

The present invention further provides a base station, comprising: a determining module, to determine, by the base station, a radio resource control RRC signaling to be transmitted, according to the connectivity mode of a user equipment and/or a measurement gap type of the user equipment; and a transmitting module, to transmit the RRC signaling to the user equipment, wherein the RRC signaling is for determining, at the user equipment side, a measurement gap used in the measurement and/or determining a scaling factor for a performance requirement of the measurement, according to the connectivity mode of the user equipment and/or the measurement gap type of the user equipment.

In addition, the present invention provides an electronic device, including: a processor; and a memory, configured to store machine readable instructions which, when executed by the processor, cause the processor to perform any one of the forgoing methods.

The present invention further provides a computer readable storage medium comprising instructions which, when executed by a processor, cause the processor to perform any one of the forgoing methods.

Compared with the prior art, the present invention has at least the following advantages: a method of using and sharing the measurement gap in the new generation wireless communication system is provided. In particular, the method can determine the usage of the measurement gap according to settings of the BWP on the carrier configured by the user. The method also provides a scheme for sharing the measurement gap between multiple measurement objects in combination with the network characteristics, in an environment with limited signaling resources. Also, the method may dynamically change the meaning expressed by each type of signaling according to the current state of the UE accessing the network. Finally, the present invention also defines that the applicable range and the application manner of the sharing mechanism in different situations provide convenience for actual implementation. Therefore, the present invention provides an improved method of using the measurement gap by fully considering external factors and itself characteristics, and provides a method of sharing the measurement gap with a very small overhead, thereby greatly improving usage efficiency of the wireless resource in the network.

BRIEF DESCRIPTION OF THE DRAWINGS

The above and/or additional aspects and advantages of the present invention will become apparent and readily understood from the following description of embodiments in connection with the drawings in which.

DETAILED DESCRIPTION

Figure 1:
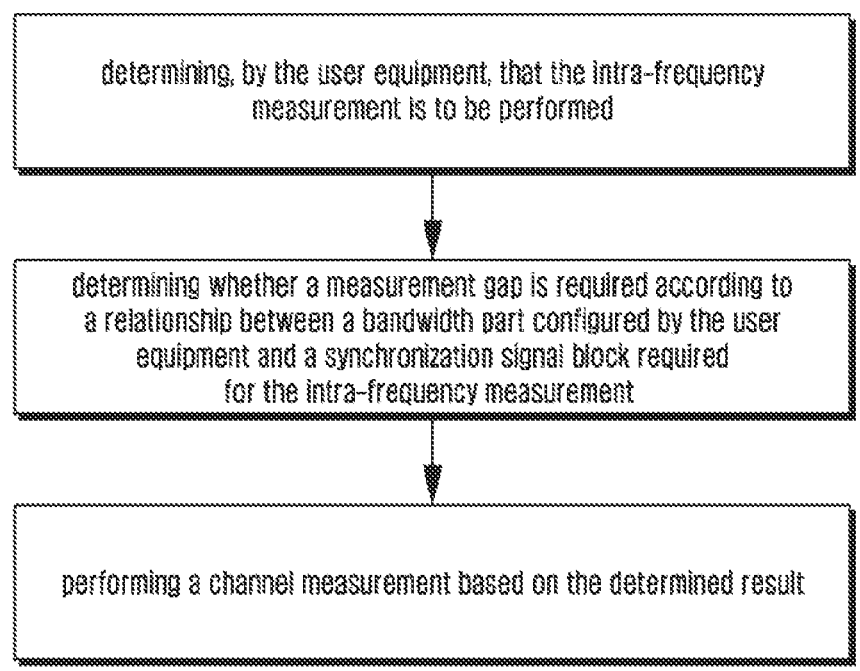
FIG. 1 illustrates a flow chart of a method for a channel measurement according to an embodiment of the present invention.

The embodiments of the present invention are described in detail below, and examples of the embodiments will be described with reference to the accompanying drawings. The embodiments described below with reference to the drawings are exemplified, and are not intended to limit the invention.

In a wireless communication system, a user equipment (UE) needs to measure signal quality over different cells (or channels), in order to satisfy important functions for mobility requirements, such as access cell reselection or inter-cell handover. Whether the UE is in the initial access state and or a connection has been established, it is necessary to measure the signal quality from its neighboring cells. The signal measurement performed by the UE in the connected state comprises that the measurement control information is transmitted from the network side to the UE, where the information includes the measurement identifier, the measurement objects and other related attributes, and that the UE performs the measurement according to a report configuration, and generates a measurement report to be reported to the network side according to measurement results. The so-called UE measures the measurement objects actually refers to the UE measures or identifies a signal on a carrier where the target cell is located. According to the carrier frequency and carrier spacing of the measurement object, the measurement can be classified into Intra-Frequency Measurement and Inter-Frequency Measurement. The case where the carrier frequency center frequency and the carrier spacing of the measurement object are consistent with that of the serving cell is called Intra-Frequency Measurement; and the case otherwise is called Inter-Frequency Measurement. If the measurement object is a radio access technology different from the current serving cell, it is called Inter-Radio Access Technology Measurement (Inter-RAT Measurement). For example, when the current serving cell is E-UTRAN (Evolved Universal Terrestrial Radio Access Network), the measurement on other non-E-UTRAN technologies is the Inter-RAT Measurement. Measurement behaviors of the network for the UE has corresponding performance requirements, that is, the time period during which the UE reports the instantaneous measurement result should meet a certain condition.

For the measurement in some cases, during the measurement, the UE needs to configure a measurement gap, that is, a specified period of time, during which the UE temporarily suspends communication with the serving cell to perform these measurements, because in some measurement procedures, such as inter-frequency measurement or inter-RAT measurement, the UE may need to receive signals from carriers distinct from the current data link, and thus may need to interrupt the current data transmission and reception process to meet the measurement requirements. If it is required to configure the measurement gap, the base station configures the UE with the measurement gap via a radio resource control (RRC) reconfiguration message. For other measurement tasks, the UE may perform the measurement tasks directly without the measurement gap. During the measurement gap, the base station does not expect data exchange with the UE.

With the continuous development of mobile communication technology, Carrier Aggregation (CA) has been applied to systems from the Long Term Evolution Advance (LTE-A). The object is to provide UE(s) having corresponding capabilities with more bandwidth to increase the peak rate of the UE. The Carrier aggregation can aggregates two or more component carriers (CCs) to support a larger transmission bandwidth. For example, in LTE-A, a maximum of 5 CCs can be aggregated to obtain a transmission bandwidth of no more than 100 MHz. After the UE enters the connected state, it can communicate with the source base station via multiple component carriers (such as CC1 and CC2) at the same time. The base station designates a primary component carrier (PCC) for the UE through explicit configuration or according to protocol(s); and the remaining component carrier(s) may be called a secondary component carrier (SCC). Furthermore, a serving cell on the DL (downlink) PCC may be called a Primary Serving Cell (Pcell, for short), while a serving cell on the DL SCC may be called a Secondary Serving Cell (Scell, for short). When performing measurement tasks in the system, if the measurement gap has been configured, data reception in some serving cells is suspended for the measurement. Therefore, the use of the measurement gap can seriously affect the usage efficiency of radio resources and transmission performance. The measurement on the cell (channel) is thus also the measurement on the component carrier corresponding to the cell.

With the evolution of standards, a new generation of mobile communication network NR (New Radio) has been proposed, and its standardization work is also underway. In the NR system, a number of major technologies are introduced or changed. For example, the millimeter wave band is introduced in NR, and the frequency of 6 GHz is used as a boundary line, by which frequency bands below 6 GHz is called FR1 (Frequency Range 1), and frequency bands higher than 6 GHz is called FR2 (Frequency Range 2). In this case, new solutions are needed for many old problems.

In the new generation of communication systems, devices in the network may be in a multi-RAT Dual Connectivity (MR-DC) where multiple wireless access technologies coexist. In this state, the UE for multi-transmissions/receptions is configured to use resources from two different nodes, one of which is a master node and the other is a secondary node. The two nodes may use the same access technology or different access technologies. For example, when the master cell group is E-UTRA (Evolved Universal Terrestrial Radio Access) and the secondary cell group is NR, the network may be called EN-DC (E-UTRA-NR DC). If the master cell group and the secondary cell group are switched with each other, it may be called NE-DC instead, that is, the UE is in a dual connection state NE-DC in which the UE is simultaneously connected to one NR base station as the master cell group and one LTE base station as the secondary cell group. If both nodes are NR, it may be called NR-NR DC, that is, the UE is in a dual connection state NR-NR DC in which the UE is simultaneously connected to NR master cell group and NR secondary cell group.

In the NR system, on one CC, one resource block (RB) is defined as 12 consecutive frequency domain subcarriers, and a number of consecutive physical resource blocks are defined as a bandwidth part (BWP). On one CC, one UE can be configured with at most 4 BWPs as radio resources for receiving or transmitting data and control information, etc., where only one BWP is active at the same time.

In the NR system, signals for cell synchronization and channel measurement, including Primary Synchronization Signal (PSS), Secondary Synchronization Signal (SSS), etc., are significantly different, in terms of the structure and transmission manner on time-frequency resources, from that in the LTE-A system. The reference signals for synchronization form a time-frequency resource block, called a Synchronization Signal Block (SSB), and the channel measurement of the NR can be performed based on the SSB received by the UE. The SSB based Measurement Timing Configuration (SMTC) may be configured on each of the carriers, where the SMTC provides information such as the period, duration, offset, etc. of the SSB over a measurement window of at most 5 ms. If a measurement object requires a measurement gap (SSB-assisted Measurement), the UE will not expect to be able to detect a SSB on the measurement objects that is earlier than the measurement gap start time plus the radio frequency (RF) chain adjustment time, as well as an a SSB on the measurement objects that is later than the measurement gap end time minus the RF chain adjustment time. Similarly, in NR, the UE may need the measurement gap to identify and measure a certain carrier. At this time, if the UE does not support an individual measurement gap mode for each frequency range (i.e., per frequency range gap (per-FR Gap) is not supported), the network will provide an individual per-UE measurement gap (per-UE Gap) for measuring all objects; otherwise, the network will provide a per-frequency range gap to measure the measurement objects within this frequency range, or provide individual per-user measurement gap for measuring all objects.

In the NR network, the UE can be classified into at least four types based on the SSB measurements:
1. Measurement type A, an intra-frequency measurement which does not require the measurement gap and interruption;
2. Measurement type B, an intra-frequency measurement which requires interruption;
3. Measurement type C, an intra-frequency measurement which requires the measurement gap; and
4. Measurement type D, an inter-frequency measurement and an intra-RAT measurement.

On the other hand, in the NR network, considering the network configured measurement gap as well as the SMTC period and offset, the following scenarios may occur:
1. Scenario 1, each of the configured SMTCs overlaps with the measurement gap in time;
2. Scenario 2, a part of the configured SMTCs overlaps with the measurement gap in time; and
3. Scenario 3, none of the configured SMTCs overlaps with the measurement gap in time.

Although the measurement procedure and rules in the individual LTE-A system have been standardized by the 3GPP organization; however, considering the new technology in the new generation of mobile communication systems, the rules and methods for channel measurement should be designed in combination with the new network characteristics. The problem of how to configure and use the measurement gap during measurement is the key point that the network needs to consider, because the use of the measurement gap seriously affects the efficiency of the network for wireless resources, and an improved method for using the measurement gap can improve transmission efficiency significantly. Since the SSB-based measurement in the NR system has a relatively long period and reference signals cannot be easily obtained as in the LTE-A system, the measurement object in the NR system will bring many new problems. For example, in LTE-A, the intra-frequency measurement may obtain the reference signals of the measurement objects without adjusting the radio frequency receiving point, and therefore the intra-frequency measurement does not require the measurement gap; while in the NR, the position of the reference signal SSB and the BWP configured by the UE need to be considered, therefore, even the intra-frequency measurement may require the measurement gap. In general, there are two important problems to be solved regarding the use of the measurement gap, one of which is in which scenario, the measurement gap should be used for measurement, and another one is if there are multiple types of measurement objects within the measurement gap, how to distribute the measurement gap.

Therefore, in view of the above problems, it is necessary to provide an effective technical solution to solve the problem with respect to the use condition of the measurement gap and the sharing of the measurement gap among a plurality of measurement objects in the NR system.

In order to achieve the purpose of the present invention, as shown in FIG. 1, the present invention provides a channel measurement method, including: determining, by the user equipment, that the intra-frequency measurement is to be performed; determining whether a measurement gap is required according to a relationship between a bandwidth part configured by the user equipment and a synchronization signal block required for the intra-frequency measurement; performing a channel measurement based on the determined result.

In particular, the present invention provides a method of using a measurement gap in a channel measurement, including the contents as follows.

Firstly, defining the conditions that the UE should perform the measurement within the measurement gap, that is, the UE should configure the measurement gap for the measurement that satisfies the following conditions:
1. The UE performs an inter-frequency measurement or an inter-RAT measurement;
2. The UE performs the intra-frequency measurement, and the measurement requires a measurement gap;
3. The UE performs the intra-frequency measurement, and the measurement does not require a measurement gap, but all configured SMTCs overlap with the configured measurement gap in time.

The intra-frequency measurement in the above condition 3 can be regarded as the same type as the intra-frequency measurement in the condition 2. Specifically, for the intra-frequency measurement that requires the measurement gap in the condition 2, it is provided two defining methods in the present invention.

In the first method, in all the BWPs configured by the UE, the currently active BWP completely contains the SSB used in the intra-frequency measurement on the frequency resource, at this time, when the UE performs the measurement it is not required to configure the measure gap. Conversely, if the currently active BWP does not completely contain the SSB used in the intra-frequency measurement on the frequency resource, the measurement gap is required for the measurement performed by the UE.

In the second method, in all the BWPs configured by the UE, all the configured BWPs each completely contain the SSB used in the intra-frequency measurement on the frequency resource, at this time, when the UE performs the measurement it is not required to configure the measure gap. Conversely, if at least one of the configured BWPs does not completely contain the SSB used in the intra-frequency measurement on the frequency resource, the measurement gap is required for the measurement performed by the UE.

Figure 2:
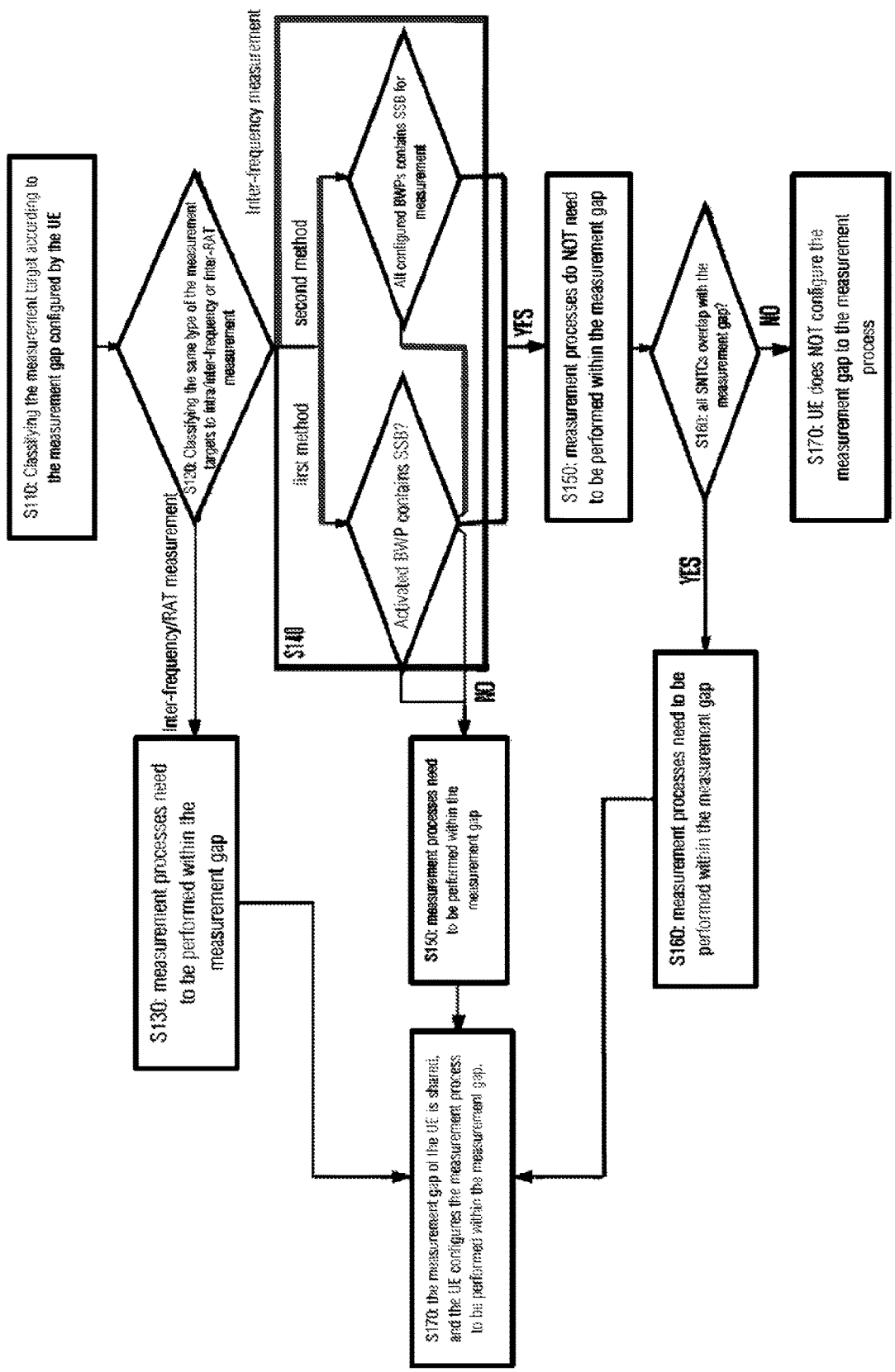
FIG. 2 illustrates a flow chart of a method of using the measurement gap in a channel measurement according to an embodiment of the present invention.

The usage rule of the measurement gap is shown in the flow diagram of FIG. 2, including the following steps:

S110: Classifying the measurement objects according to the measurement gap configured by the UE. Specifically, if the UE uses the per-UE measurement gap, all the measurement objects will be classified into one category; if the UE uses the per-FR measurement gap, the measurement objects on the FR1 will be classified into one category, the measurement objects on FR2 will be classified into another one category.

S120: For all the measurement objects that UE need to measure and that is classified into the same type, classifying these measurement objects into three different kinds of measurements according to the definitions of the intra-frequency measurement, the inter-frequency measurement, and the inter-RAT measurement.

S130: For the inter-frequency measurement and the inter-RAT measurement, the UE may configure these measurement objects to be measured within the measurement gap.

S140: Regarding the specific relationship between the measurement reference signal SSB and the BWP configured by the UE, in the present invention, two methods are provided for definition. Specifically, the specific relationship satisfied in the two methods is as follows.

In the first method, the specific relationship satisfied between the measurement reference signal SSB and the BWP configured by the UE refers to, among all the at most four BWPs configured by the UE, the currently active one BWP completely contains SSBs used in the intra-frequency measurement on the frequency resource. Conversely, if one of the currently active BWPs does not completely contain the SSB used in the intra-frequency measurement on the frequency resource, the specific relationship is not satisfied.

In the second method, the specific relationship satisfied between the measurement reference signal SSB and the BWP configured by the UE refers to, among all the at most four BWPs configured by the UE, all the configured BWPs each completely contain the SSB used in the intra-frequency measurement on the frequency resource. Conversely, if at least one of the configured BWPs does not completely contain the SSB used in the intra-frequency measurement on the frequency resource, the specific relationship is not satisfied.

S150: If the specific relationship defined in the first method or the second method in S140 is satisfied between the reference signal SSB required for the measurement and the BWP configured by the UE, the measurement may be performed without configuring the measurement gap. If not belonging to the specific relationship described in S140, this measurement requires the measurement gap to be configured for measurement.

S160: For the process of performing measurement without configuring a measurement gap as described in S150, comparing the measurement gap configured by the UE with the SMTC of the measurement objects. If all SMTCs each completely overlap with the configured measurement gap in time, the UE also configures these measurement objects within the measurement gap for measurement. Otherwise, when the UE performs these measurements, the measurement is performed directly without configuring the measurement gap.

S170: For the foregoing measurement that needs to be configured within the measurement gap, the UE may arrange the measurement within the measurement gap; otherwise, the measurement may not be configured to be performed within the measurement gap.

The foregoing method for using measurement gap on the UE provided by the present invention indicates which measurement objects the UE should configure the measurement gap during measurement, in particular, where two methods are included to define a specific relationship between the measurement SSB and the UE-configured BWP, and Based on this, the UE's configuration of the measurement gap is determined. The invention provides a reasonable method of using the measurement gap according to the characteristics of the network, so that the network resource can be effectively utilized.

Based on the usage rule of the measurement gap provided by the above method, in the measurement in which the UE configures the measurement gap, if multiple measurement objects (measurement object instances) share the same measurement gap, the present invention separately provides a channel measurement method on the user equipment side and on the cell base station side, provides that a scaling factor for a performance requirement of the measurement may vary if the measurement gap needs to be shared.

Figure 3:
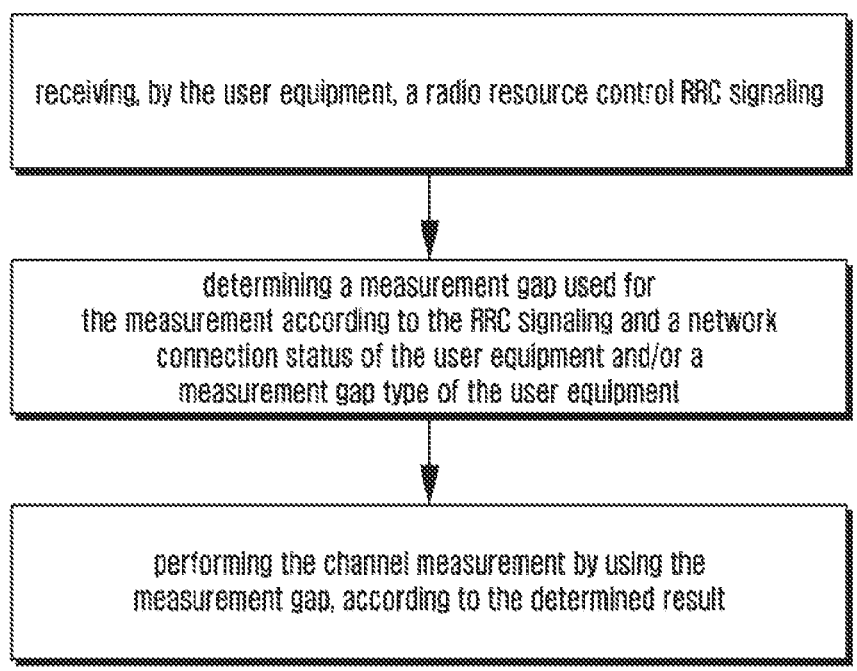
FIG. 3 illustrates a flow chart of a method for a channel measurement on a user equipment side according to an embodiment of the present invention.

As shown in FIG. 3, the present invention provides a channel measurement method on a user equipment side, including the following steps: receiving, by the user equipment, a radio resource control RRC signaling; determining a measurement gap used in the measurement and/or determining the scaling factor for the performance requirement of the measurement depending on the RRC signaling as well as the connectivity mode of the user equipment and/or a measurement gap type of the user equipment; performing the channel measurement by using the measurement gap and/or calculating out the scaling factor for the performance requirement of the measurement, according to the determined result.

Figure 4:
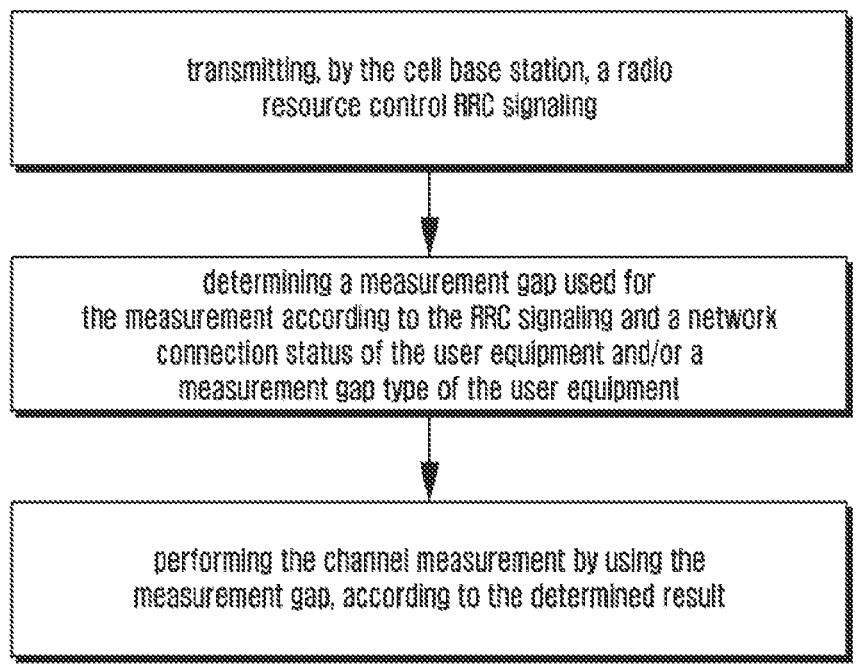
FIG. 4 illustrates a flow chart of a method for a channel measurement on a base station side according to an embodiment of the present invention.

As shown in FIG. 4, the present invention provides a channel measurement method on a cell base station side, including the following steps: transmitting, by the cell base station, a radio resource control RRC signaling; determining a measurement gap used in the measurement and/or determining the scaling factor for the performance requirement of the measurement depending on the RRC signaling and the connectivity mode of the user equipment and/or a measurement gap type of the user equipment; performing the channel measurement by using the measurement gap and/or calculating out the scaling factor for the performance requirement of the measurement, according to the determined result.

Figure 5:
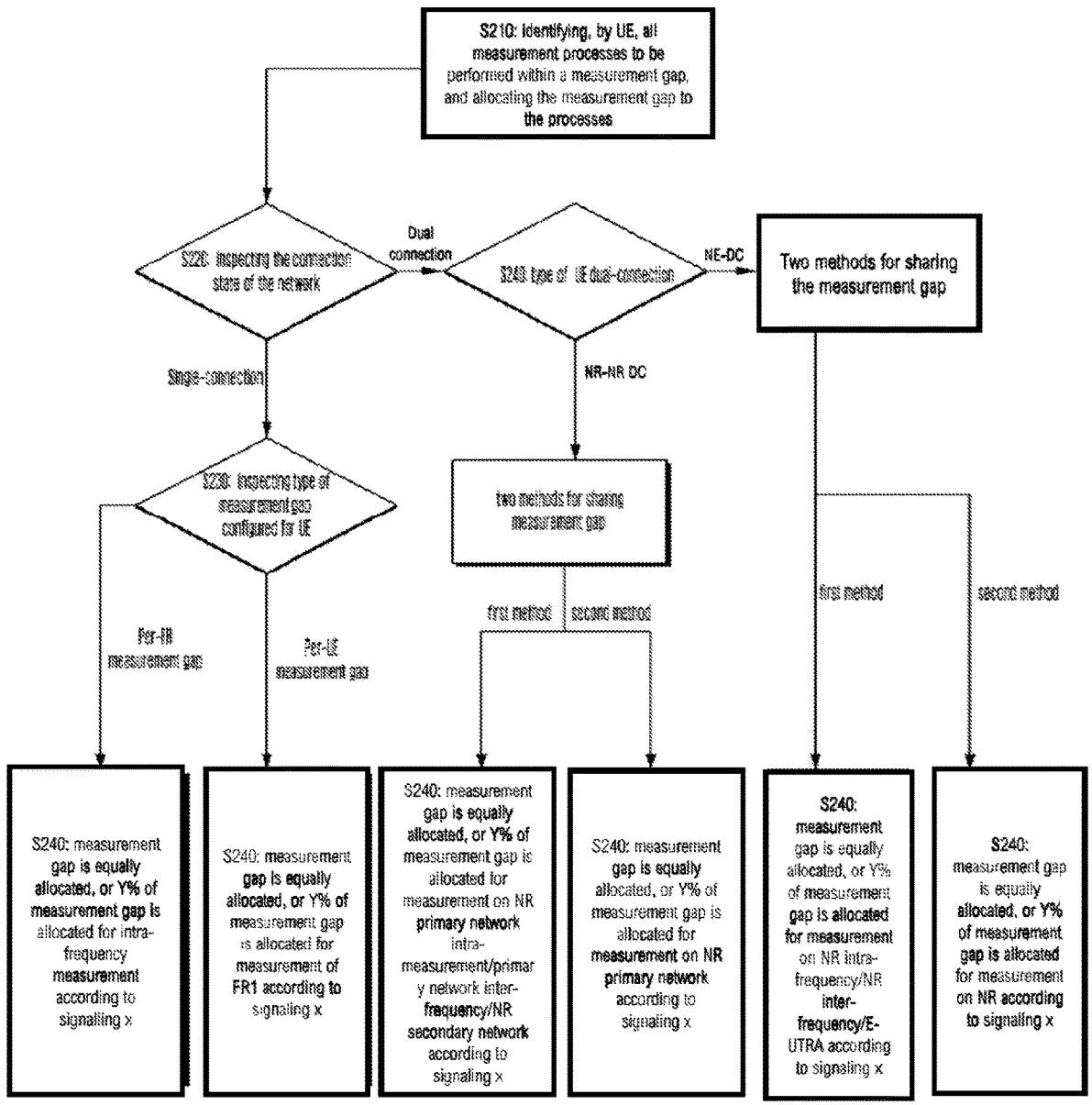
FIG. 5 illustrates a flow chart of a method of sharing the measurement gap in a channel measurement according to an embodiment of the present invention.

At this time, the UE uses the sharing mechanism and method of the measurement gap. Specifically, the sharing mechanism and method of the measurement gap are shown in the flow diagram of FIG. 5, and the following process steps are included:

S210: For the UE in the connected state, determining whether there are a plurality of the measurement objects, and whether the UE needs to configure a measurement gap for the measurement object according to the process shown in FIG. 5. If there are at least two such measurement objects, the network should configure a RRC signaling X with a length of 2 bits for the UE, indicating up to four different possibilities. In this case, the UE needs to share the configured measurement gap in a plurality of measurement objects.

S220: Inspecting the connection state of the network, that is, whether the UE has accessed a single-connection network or a multi-connection network. In different network states, the signaling X may indicate different modes for sharing the measurement gap, as described in S240.

S230: Inspecting the type of configured measurement gap that the network configures for the UE, that is, whether UE is configured with a per-UE measurement gap or a per-FR measurement gap. In case that different types of the measurement gap is configured, the signaling X may indicate different modes for sharing the measurement gap, as described in S240.

S240: As described in the forgoing S220 and S230, at most 4 usage modes of the measurement gap are indicated by the signaling X, and in the present invention, the following specific definitions are given.

When the network is in the single-connection state, if the configured measurement gap is the per-FR measurement gap, four state allocation modes of X include one or more of the following methods:
1. X=00, all the measurement gaps configured by the UE are equally allocated to all the measurements that are required to receive the synchronization signal block within the measurement gap;
2. X=01, at least or at most $Y_1$% (such as $Y_1$=25) of the measurement gap is allocated to the intra-frequency measurement of the UE, and the remaining of the measurement gap is allocated to the other measurement objects to be measured by the UE and required to receive the synchronization signal block within the measurement gap;
3. X=10, at least or at most $Y_2$% (such as $Y_2$=50) of the measurement gap is allocated to the intra-frequency measurement of the UE, and the remaining of the measurement gap is allocated to the other measurement objects to be measured by the UE and required to receive the synchronization signal block within the measurement gap;
4. X=11, at least or at most $Y_3$% (such as $Y_3$=75) of the measurement gap is allocated to the intra-frequency measurement of the UE, and the remaining of the measurement gap is allocated to the other measurement objects to be measured by the UE and required to receive the synchronization signal block within the measurement gap;

When the network is in the single-connection state, if the measurement gap configured by the UE is the per-UE measurement gap, the four state allocation modes of X include one or more of the following methods:
1. X=00, all the measurement gaps configured by the UE are equally allocated to all the measurements that are required to receive the synchronization signal block within the measurement gap;
2. X=01, at least or at most Y1% (such as $Y_1$=25) of the measurement gap is allocated to the measurement objects of the UE on the FR1, and the remaining of the measurement gap is allocated to the other measurement objects to be measured by the UE and required to receive the synchronization signal block within the measurement gap;
3. When X=10, at least or at most Y2% (such as $Y_2$=50) of the measurement gap is allocated to the measurement objects of the UE on the FR1, and the remaining of the measurement gap is allocated to the other measurement objects to be measured by the UE and required to receive the synchronization signal block within the measurement gap;
4. When X=11, at least or at most Y3% (such as $Y_3$=75) of the measurement gap is allocated to the measurement objects of the UE on the FR1, and the remaining of the measurement gap is allocated to the other measurement objects to be measured by the UE and required to receive the synchronization signal block within the measurement gap;

When the network is in the dual connection state, if the master cell group to which the UE is connected is NR and the secondary cell group is E-UTRA (NE-DC), there are two methods for the four state allocation modes of X.

One method including one or more of the following methods is:
1. When X=00, all the measurement gaps configured by the UE are equally allocated to all measurements that are required to receive the synchronization signal block within the measurement gap;
2. When X=01, at least or at most Y1% (such as $Y_1$=25) of the measurement gap is allocated to the measurement objects on the NR network or FR1 measurement objects in NR or FR1 intra-frequency measurement objects in NR, and the remaining of the measurement gap is allocated to the other measurement objects to be measured by the UE and required to receive the synchronization signal block within the measurement gap;
3. When X=10, at least or at most Y2% (such as $Y_2$=50) of the measurement gap is allocated to the measurement objects on the NR network or FR1 measurement objects in NR or FR1 intra-frequency measurement objects in NR, and the remaining of the measurement gap is allocated to the other measurement objects to be measured by the UE and required to receive the synchronization signal block within the measurement gap;
4. When X=11, at least or at most Y3% (such as $Y_3$=75) of the measurement gap is allocated to the measurement objects on the NR network or FR1 measurement objects in NR or FR1 intra-frequency measurement objects in NR, and the remaining of the measurement gap is allocated to the other measurement objects to be measured by the UE and required to receive the synchronization signal block within the measurement gap.

Another one method including one or more of the following methods is:
1. When X=00, all the measurement gaps configured by the UE are equally allocated to all measurements that are required to receive the synchronization signal block within the measurement gap;
2. When X=01, at least or at most Y4% (such as Y4=50) of the measurement gap is allocated to the intra-frequency measurement objects on the NR network or FR1 measurement objects in NR or FR1 intra-frequency measurement objects in NR, and the remaining of the measurement gap is allocated to the other measurement objects to be measured by the UE and required to receive the synchronization signal block within the measurement gap;
3. When X=10, at least or at most Y5% (such as Y5=50) of the measurement gap is allocated to the inter-frequency measurement objects on the NR network, and the remaining of the measurement gap is allocated to the other measurement objects to be measured by the UE and required to receive the synchronization signal block within the measurement gap;
4. When X=11, at least or at most Y6% (such as Y6=50) of the measurement gap is allocated to the measurement objects on the LTE network, and the remaining of the measurement gap is allocated to the other measurement objects to be measured by the UE and required to receive the synchronization signal block within the measurement gap.

When the network is in the dual connection state, if the master cell group and the secondary cell group to which the UE is connected both are NR (NR-NR DC), there are two methods for the four state allocation modes of X, One method including one or more of the following methods is:
1. When X=00, all the measurement gaps configured by the UE are equally allocated to all measurements that are required to receive the synchronization signal block within the measurement gap;
2. When X=01, at least or at most Y1% (such as $Y_1=25$) of the measurement gap is allocated to the measurement objects on the NR master cell group or intra-frequency measurement objects on the NR master cell group, and the remaining of the measurement gap is allocated to the other measurement objects to be measured by the UE and required to receive the synchronization signal block within the measurement gap;
3. When X=10, at least or at most Y2% (such as $Y_2=50$) of the measurement gap is allocated to the measurement objects on the NR master cell group or intra-frequency measurement objects on the NR master cell group, and the remaining of the measurement gap is allocated to the other measurement objects to be measured by the UE and required to receive the synchronization signal block within the measurement gap;
4. When X=11, at least or at most Y3% (such as $Y_3=75$) of the measurement gap is allocated to the measurement objects on the NR master cell group or intra-frequency measurement objects on the NR master cell group, and the remaining of the measurement gap is allocated to the other measurement objects to be measured by the UE and required to receive the synchronization signal block within the measurement gap.

Another one method including one or more of the following methods is:
1. When X=00, all the measurement gaps configured by the UE are equally allocated to all measurements that are required to receive the synchronization signal block within the measurement gap;
2. When X=01, at least or at most Y4% (such as Y4=50) of the measurement gap is allocated to measurement objects on a NR master cell group or the intra-frequency measurement objects on the NR master cell group, and the remaining of the measurement gap is allocated to the other measurement objects to be measured by the UE and required to receive the synchronization signal block within the measurement gap;
3. When X=10, at least or at most Y5% (such as Y5=50) of the measurement gap is allocated to the inter-frequency measurement on the NR master cell group, and the remaining of the measurement gap is allocated to the other measurement objects to be measured by the UE and required to receive the synchronization signal block within the measurement gap;
4. When X=11, at least or at most Y6% (such as Y6=50) of the measurement gap is allocated to all the measurement objects on the NR secondary cell group, and the remaining of the measurement gap is allocated to the other measurement objects to be measured by the UE and required to receive the synchronization signal block within the measurement gap.

The above method for sharing UE measurement gap according to the present invention indicates, when the UE is in a certain state, how to share the measurement gap in the overlapping measurements according to the control signaling X. In particular, the method defines distinct meanings of the varying signaling X according to corresponding states of the UE, and defines the specific meaning indicated by X in a particular case, e.g. setting a lower limit of the ratio of the measurement gap utilized by a certain measurement. The present invention provides an improved method for sharing the measurement gap according to states of the network and the UE with reduced signaling overhead.

In another aspect, the present invention provides a method of determining a scaling factor for a performance requirement of the measurement. The scaling factor, when the UE is in the NE-DC state or the NR-NR DC connection state, is determined by an allocation ratio in any method of the sharing allocation schemes of the measurement gap described above The method of determining the scaling factor specifically includes at least one of the following:

If the measurement gap allocation ratio of a certain type of measurement is Y% (such as Y=50), the scaling factor for the performance requirement of such type of measurement is 1/Y×100 (1/50×100);

The scaling factor for the performance requirement of other types of measurement other than such type of measurement is 1/(100−Y)×100 (1/(100−50×100).

When the user equipment is in a dual connection state NE-DC in which the user equipment is simultaneously connected to NR base station as a master cell group and LTE base station as the secondary cell group, the above-mentioned certain type of measurement objects includes intra-frequency measurement objects on the NR network or FR1 measurement objects in NR or FR1 intra-frequency measurement objects in NR; when the user equipment is in a dual connection state NR-NR DC, in which the user equipment is simultaneously connected to NR master cell group and NR secondary cell group, the above certain type of measurement object includes FR1 measurement objects in NR or FR1 intra-frequency measurement objects in NR.

The network may implicitly specify a sharing allocation scheme for the UE measurement gap, and only specifies the scaling factor for the performance requirement of the measurement. When calculating the scaling factor, a classification manner of the measurement objects is the same as that of the measurement in the aforementioned allocation scheme.

The final measurement performance requirement is a product of the scaling factor and the original performance requirement.

In addition, the method also provides an applicable range and an application manner of the method for sharing the measurement gap, i.e., defining the measurement gap on which the method for sharing the measurement gap above is applicable, and how to use the method.

Figure 6:
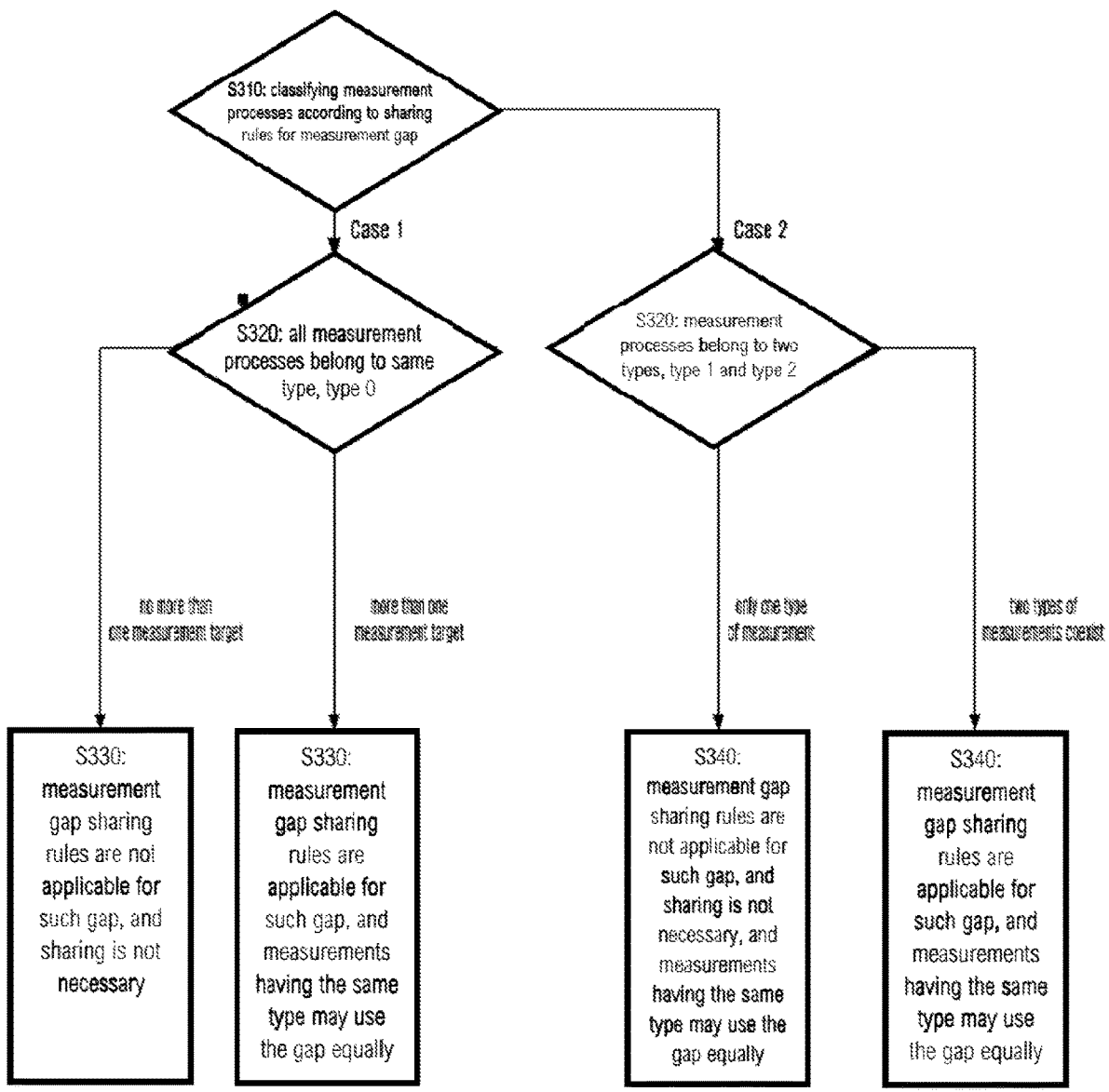
FIG. 6 illustrates a flowchart of a method of determining the applicable range and application manner of the method for sharing the measurement gap in a channel measurement according to an embodiment of the present invention.

In particular, FIG. 6 illustrates a flowchart of determining the applicable range and the application manner of the sharing mechanism, including:

S310: Firstly, classifying all measurement objects that may need to be configured with the measurement gap; If the measurement gap sharing manner indicated by X is that all the measurement gaps are to be equally allocated to all the measurement objects, all the measurement gaps will be classified into the same class, i.e., type 0; if the measurement gap sharing manner indicated by X is that at least or at most Y% of the measurement gap is allocated to a certain type of measurement and remaining of the measurement gap is allocated to the other types of measurement, the former "a certain type" is classified into type 1 and the latter "the other types" are classified into type 2.

S320: Regarding S310, there are two cases for the measurement instances classification.
1. Case 1: all measurement objects that need the measurement gap belong to the same type classified in S310, in this case, all the measurement objects may be either type 0 or type 1.
2. Case 2: all measurement objects that need the measurement gap may respectively belong to the type 1 or type 2 classified in S310, i.e., at least one measurement object belongs to type 1 and at least one measurement object belongs to type 2.

According to the two cases described in S320, the applicable range and the application manner of the measurement gap are as follows:

S330: For Case 1 in S320, for all the measurement gaps, if the UE can measure more than one measurement object within the measurement gap, the measurement gap sharing mechanism described in the present invention is applicable, and the measurements performed within the measurement gap have an equal opportunity to use the measurement gap. Otherwise, if the UE can measure no more than one measurement object within the measurement gap, the measurement gap sharing mechanism described in the present invention and the ratio indicated by the signaling X are not applicable, and the UE may directly measure the objects within the measurement gap.

S340: For Case 2 in S320, for all the measurement gaps, if the measurement objects that the UE can measure within the measurement gap include type 1 and type 2 both and the number of type 1 and type 2 are each at least one, the measurement gap sharing mechanism described in the present invention is applicable, and the measurement gap may be allocated to the type 1 measurement and the type 2 measurement according to the ratio indicated by signaling X. Otherwise, if all the measurement objects that the UE can measure within the measurement gap belong to a certain type, i.e., at least one of the type 1 or type 2 of measurement objects has no measurement object, the measurement gap sharing mechanism and the ratio indicated by X are not applicable. In this case, if the number of the measurement objects that can be measured is more than 1, the measurement objects may have an equal opportunity to use the measurement gap, or the UE may select measurement objects to use the measurement gap according to itself conditions.

The present invention provides a method of using and sharing the measurement gap in the new generation wireless communication system. In particular, the method can determine the usage of the measurement gap according to settings of the BWP on the carrier configured by the user. The method also provides a scheme for sharing the measurement gap between a plurality of measurement objects in combination with the network characteristics in an environment with limited signaling resources. Also, the method may dynamically change the meaning expressed by each type of signaling according to the current state of the UE accessing the network. Finally, the present invention also defines that the applicable range and the application manner of the sharing mechanism in different situations provide convenience for actual implementation. Therefore, the present invention provides an improved method of using the measurement gap by fully considering external factors and itself characteristics, and provides a method of sharing the measurement gap with a very small overhead, thereby greatly improving usage efficiency of the wireless resource in the network.

It will be appreciated by one skilled in the art that all or parts of steps of the method according to above embodiments may be carried out by a program stored in a computer readable storage medium in connection with related hardware that the program instructs. One or a combination of the steps of the method is performed when the program is executed.

Figure 7:
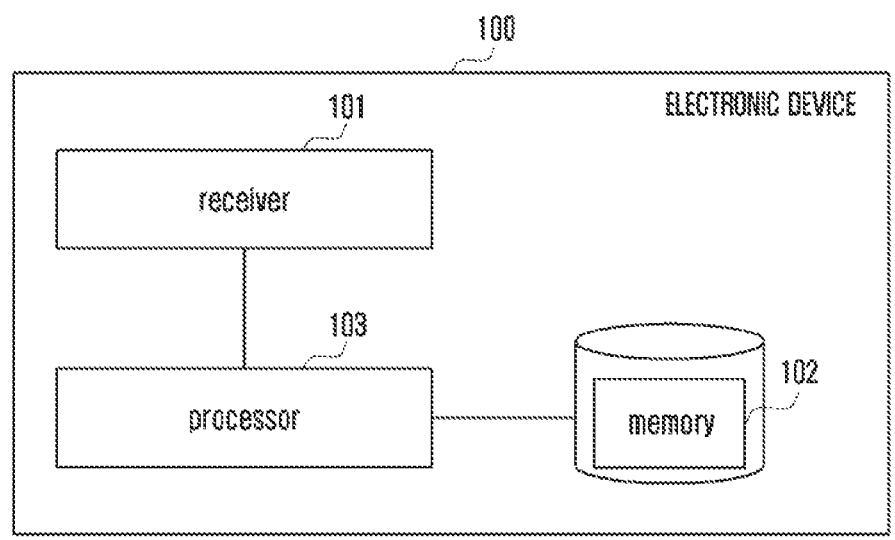
FIG. 7 illustrates a schematic diagram of an electronic device that performs a method for a channel measurement according to an embodiment of the present invention.

In particular, as shown in FIG. 7, the electronic device 100 may receive various signaling from a base station, such as RRC signaling, through the receiver 101. The processor 103 may perform the above-described channel measurement method by executing a program stored in the memory 102 depending on the RRC signaling. In particular, the processor may utilize the measurement gap sharing mechanism for the channel measurement.

In addition, function modules in various embodiments of the present invention may be integrated into one processing module, or separately arranged physically, or integrated by two or more modules into one module. Integrated modules may be implemented in form of hardware or in form of software. The integrated modules, if implemented in form of software and sold or used as a separate product, may also be stored in a computer readable storage medium.

The storage medium above may be a read only memory, a magnetic disk or an optical disk or the like.

The above description is only a part of embodiments of the present invention, and it should be noted that one skilled in the art can also make modifications and improvements without departing from the spirit of the present invention, which should be considered to be within the scope of the present invention.

The invention claimed is:

1. A method performed by a terminal in a communication system, the method comprising:
receiving, from a base station, a radio resource control (RRC) message including a measurement gap sharing configuration, wherein the measurement gap sharing configuration includes measurement gap sharing scheme information;
determining a first scaling factor of a first measurement object associated with a first frequency range (FR) based on a value indicated by the measurement gap sharing scheme information; and
determining a second scaling factor for a second measurement object associated with a second FR based on the value indicated by the measurement gap sharing scheme information,
wherein the terminal is configured for a type of dual connectivity (DC).

2. The method of claim 1, wherein the first scaling factor is identified based on a first measurement gap sharing ratio allocated to the first measurement object, and
wherein the second scaling factor is identified based on a second measurement gap sharing ratio allocated to the second measurement object.

3. The method of claim 1, wherein the measurement gap sharing scheme information is applied for the first FR, the second FR, or the terminal, and
wherein the value indicated by the measurement gap sharing scheme information is one of 00, 01, 10, and 11 corresponding to a measurement gap sharing scheme.

4. The method of claim 1,
wherein the type of the DC configured for the terminal is one of new radio radio access (NR)—evolved-universal terrestrial radio access (E-UTRA) DC or NR-NR DC, and wherein, in case that the NR-E-UTRA DC is configured for the terminal, the first measurement object is a first FR intra-frequency measurement object.

5. The method of claim 1, wherein intra-frequency measurement is performed without a measurement gap based on an identification that a synchronization signal block (SSB) is completely contained in an active bandwidth part (BWP) of the terminal.

6. A method performed by a base station in a communication system, the method comprising:
generating a radio resource control (RRC) message including a measurement gap sharing configuration, wherein the measurement gap sharing configuration includes measurement gap sharing scheme information; and
transmitting, to a terminal, the RRC message,
wherein a value indicated by the measurement gap sharing scheme information is used to determine a first scaling factor of a first measurement object associated with a first frequency range (FR),
wherein the value indicated by the measurement gap sharing scheme information is used to determine a second scaling factor for a second measurement object associated with a second FR, and,
wherein the terminal is configured for a type of dual connectivity (DC).

7. The method of claim 6,
wherein the first scaling factor is identified based on a first measurement gap sharing ratio allocated to the first measurement object, and
wherein the second scaling factor is identified based on a second measurement gap sharing ratio allocated to the second measurement object.

8. The method of claim 6, wherein the measurement gap sharing scheme information is applied for the first FR, the second FR, or the terminal, and
wherein the value indicated by the measurement gap sharing scheme information is one of 00, 01, 10, and 11 corresponding to a measurement gap sharing scheme.

9. The method of claim 6,
wherein the type of the DC configured for the terminal is one of new radio radio access (NR)—evolved-universal terrestrial radio access (E-UTRA) DC or NR-NR DC, and
wherein, in case that the NR-E-UTRA DC is configured for the terminal, the first measurement object is a first FR intra-frequency measurement object.

10. The method of claim 6, wherein intra-frequency measurement is performed without a measurement gap based on an identification that a synchronization signal block (SSB) is completely contained in an active bandwidth part (BWP) of the terminal.

11. A terminal in a communication system, the terminal comprising:
a transceiver; and
a controller coupled with the transceiver and configured to:
receive, from a base station, a radio resource control (RRC) message including a measurement gap sharing configuration, wherein the measurement gap sharing configuration includes measurement gap sharing scheme information,
determine a first scaling factor of a first measurement object associated with a first frequency range (FR) based on a value indicated by the measurement gap sharing scheme information, and
determine a second scaling factor for a second measurement object associated with a second FR based on the value indicated by the measurement gap sharing scheme information,
wherein the terminal is configured for a type of dual connectivity (DC).

12. The terminal of claim 11,
wherein the first scaling factor is identified based on a first measurement gap sharing ratio allocated to the first measurement object, and
wherein the second scaling factor is identified based on a second measurement gap sharing ratio allocated to the second measurement object.

13. The terminal of claim 11, wherein the measurement gap sharing scheme information is applied for the first FR, the second FR, or the terminal, and wherein the value indicated by the measurement gap sharing scheme information is one of 00, 01, 10, and 11 corresponding to a measurement gap sharing scheme.

14. The terminal of claim 11,
wherein the type of the DC configured for the terminal is one of new radio radio access (NR)—evolved-universal terrestrial radio access (E-UTRA) DC or NR-NR DC, and
wherein, in case that the NR-E-UTRA DC is configured for the terminal, the first measurement object is a first FR intra-frequency measurement object.

15. The terminal of claim 11, wherein intra-frequency measurement is performed without a measurement gap based on an identification that a synchronization signal block (SSB) is completely contained in an active bandwidth part (BWP) of the terminal.

16. A base station in a communication system, the base station comprising:
a transceiver; and
a controller coupled with the transceiver and configured to:
generate a radio resource control (RRC) message including a measurement gap sharing configuration, wherein the measurement gap sharing configuration includes measurement gap sharing scheme information, and
transmit, to a terminal, the RRC message,
wherein a value indicated by the measurement gap sharing scheme information is used to determine a first scaling factor of a first measurement object associated with a first frequency range (FR),
wherein the value indicated by the measurement gap sharing scheme information is used to determine a second scaling factor for a second measurement object associated with a second FR, and
wherein the terminal is configured for a type of dual connectivity (DC).

17. The base station of claim 16, wherein the first scaling factor is identified based on a first measurement gap sharing ratio allocated to the first measurement object, and
wherein the second scaling factor is identified based on a second measurement gap sharing ratio allocated to the second measurement object.

18. The base station of claim 16, wherein the measurement gap sharing scheme information is applied for the first FR, the second FR, or the terminal, and
wherein the value indicated by the measurement gap sharing scheme information is one of 00, 01, 10, and 11 corresponding to a measurement gap sharing scheme.

19. The base station of claim 16,
wherein the type of the DC configured for the terminal is one of new radio radio access (NR)—evolved-universal terrestrial radio access (E-UTRA) DC or NR-NR DC, and
wherein, in case that the NR-E-UTRA DC is configured for the terminal, the first measurement object is a first FR intra-frequency measurement object.

20. The base station of claim 16, wherein intra-frequency measurement is performed without a measurement gap based on an identification that a synchronization signal block (SSB) is completely contained in an active bandwidth part (BWP) of the terminal.

\* \* \* \* \*